United States Patent [19]

Hannerz

[11] Patent Number: 4,967,699
[45] Date of Patent: Nov. 6, 1990

[54] STEAM GENERATOR

[75] Inventor: Kare Hannerz, Västerås, Sweden

[73] Assignee: AB Asea-Atom, Sweden

[21] Appl. No.: 196,563

[22] Filed: May 20, 1988

[30] Foreign Application Priority Data

May 22, 1987 [SE] Sweden .................. 8702162-2

[51] Int. Cl.⁵ .............................................. F22B 1/02
[52] U.S. Cl. ................................ 122/32; 165/160;
122/235.15; 122/441
[58] Field of Search .......... 122/32, 33, 235 D, 235 K,
122/235 R, 412, 441; 165/160, 163

[56] References Cited

U.S. PATENT DOCUMENTS

| | | | |
|---|---|---|---|
| 3,333,630 | 8/1967 | Charcharos | 165/160 |
| 3,850,233 | 11/1974 | Wanka et al. | 122/33 |
| 3,915,123 | 10/1975 | Reisacher | 165/160 |
| 4,098,329 | 7/1978 | Culver | 122/32 |
| 4,193,447 | 3/1980 | Fah | 122/32 |
| 4,204,502 | 5/1980 | Forestier et al. | 122/32 |
| 4,287,944 | 9/1981 | Becker | 122/32 |
| 4,446,820 | 5/1984 | Jansing et al. | 122/32 |
| 4,526,742 | 7/1985 | Hannerz | 376/282 |
| 4,786,463 | 11/1988 | Fernandez et al. | 165/163 |

FOREIGN PATENT DOCUMENTS 1194680 6/1970 United Kingdom .............. 165/160

Primary Examiner—Henry A. Bennet
Assistant Examiner—Denise L. Ferensic
Attorney, Agent, or Firm—Watson, Cole, Grindle & Watson

[57] ABSTRACT

Steam generators are used in pressurized water-cooled nuclear reactors for generating steam which issues from the generator through a large bore steam outlet. Heat-exchange tubes through which feed water flows are surrounded by hot cooling water from the reactor. The tubes must be capable of being inspected and repaired. To simplify inspection and repair, the tubes are U-shaped and each end of each tube is connected upwardly to a tube plate in the steam generator, whereby each end of each tube can be reached in a simple manner through an outgoing steam outlet.

11 Claims, 2 Drawing Sheets steam out — feed water in to reactor core
from reactor core

STEAM GENERATOR

TECHNICAL FIELD

This invention relates to a steam generator for a pressurized water-cooled nuclear reactor comprising first means for the supply of hot primary water from the reactor to the generator, second means for return of hot water to the reactor, third means for the supply of secondary or feed water to the generator and fourth means for the removal of steam created by the feed water in the generator.

DISCUSSION OF PRIOR ART

For a pressurized water reactor of the so-called PIUS type, described, inter alia, in U.S. Pat. No. 4,526,742 (Hannerz), a steam generator is suitably used for once-through flow of the feed water on the secondary side, a so-called once-through steam generator (OTSG), which directly produces a somewhat superheated, dry steam in the fourth means.

For several reasons it is desirable to use an embodiment of steam generator in a water-cooled nuclear reactor in which the steam is generated inside heat-exchange tubes which are surrounded by the hot radioactive primary cooling water. In particular, if the steam generator is situated inside the same concrete pressure vessel as the reactor core, a riser tube for coolant leaving the core and the so-called density locks, it is desirable for all the heat-exchange tubes to be easily accessible for inspection and repair from above, since tube attachments to a tube plate near the bottom of a steam generator are of necessity very difficult to reach.

In an embodiment of steam generator in which steam generation occurs inside heat-exchange tubes, service operations, such as non-destructive inspection and plugging of defective tubes, is suitably carried out in direct contact with the secondary side, which has not been contaminated with—or has only insignificantly been contaminated with—radioactivity. In order to avoid that such servicing operations have to be preceded by extensive dismantling work, it is convenient to gain entry access to the heat-exchange tubes via an outgoing steam conduit (i.e. the fourth means), which typically has a diameter of 700–800 mm. Since the incoming feed water pipe (i.e. the third means) normally has much too small a diameter to permit entry by maintenance personnel, it should also be possible to provide access to the weld joint between the inlet or feed water end of each heat-exchange tube and the tube plate via the steam conduit. One object of this invention is to provide a steam generator which permits this while at the same time allowing at least substantially the entire length of each heat-exchange tube to be used for heat transfer. Thus the invention can provide a steam generator for a water-cooled nuclear reactor which is available for non-destructive testing and repair without encroaching on the primary or radioactive side of the reactor cooling system.

SUMMARY OF THE INVENTION

The afore-stated object of the invention is achieved by a construction in which a horizontal tube plate is provided in the steam generator, the upper surface of which tube plate is contacted by the secondary water but not by the primary water and in which at least one vertically disposed U-shaped bundle of heat-exchange tubes is used, each tube in the bundle being welded to the tube plate at its two upper ends, the fourth means being adapted to allow service access to all tube/tube plate welds.

Suitably the tube plate is of annular form and the primary water flows upwardly through the center of the tube plate in a riser tube forming part of the first means. Above the tube plate the riser tube can feed the hot primary water to an annular duct forming part of the second means and through which the third and fourth means pass, water in this annular duct flowing below the tube plate to surround and contact the tubes of the at least one bundle and exchange thermal energy with the feed water/steam flowing in the heat-exchange tubes.

Conveniently there are four bundles of U-shaped tubes, the inlet end of each tube in each bundle being in communication with the third means and the outlet end of each tube in each bundle being in communication with the fourth means. To allow access to the inlet ends of the tubes from the steam outlet, the inlet ends can be contained in an openable (or removable) water box. The flow of primary water back to the reactor core can be via radial gaps left between the tube bundles.

BRIEF DESCRIPTION OF THE DRAWINGS

One embodiment of steam generator in accordance with the invention will now be described, by way of example, with reference to the accompanying drawings, in which.

DESCRIPTION OF THE PREFERRED EMBODIMENT

Figure 2:
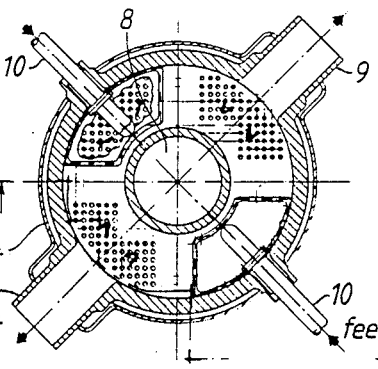
FIG. 2 is a sectional view on the line B—B in FIG. 1.

The drawings show a steam generator for a water-cooled nuclear reactor which ducts primary reactor cooling water past an array of heat-exchange tubes through which secondary, or feed, water is converted into steam.

The heat-exchange tubes 1 have a U-shape and are attached, at both upper ends, to one and the same horizontal tube plate 2. The hot water from the primary system of the reactor flows upwardly in a riser tube 8 and is then supplied from above to an annular chamber 3, the outer wall 4 of which constitutes the upper outer boundary of the steam generator. The inner wall 12 of the steam generator, at two portions 5 located opposite to each other (each of which comprises about 20% of the circumference of the inner wall 12), is perforated by a large number of small holes through which the hot primary water flows inwardly below the tube plate 2 to contact the hot end of each heat-exchange tube located behind the inner wall. The steam generated in the tubes 1 passes out through the tube plate 2 into a steam chamber above this inlet portion.

The flow of secondary water inside and primary water outside the tubes thus takes place in counter flow, while steam generation takes place inside and cooling of the primary water takes place outside the tubes.

When the primary water has passed along the entire length of each U-tube and has reached the underside of that area on the tube plate 2 where the feed water inlet end of the U-tubes is welded, the primary water loses contact with the tube bundle and passes via a perforated plate out into a respective one of four radially disposed vertical gaps 6, each of which separates a region where the primary water flows upwards from a region where it flows downwards. The primary water then flows downwards along these gaps 6 to their lower ends where the gaps connect with an annular space 7 having an outer diameter approximately equal to the above-mentioned outer diameter of the outer wall 4. From the space 7 the primary water flows in a further annular duct 7a back to the reactor.

A plurality of U-shaped tube bundles, preferably four, depend from the one tube plate 2, this being given an annular shape by virtue of the centrally located riser tube 8. Suitably, as shown, the steam generator is provided with two output steam conduits 9 and two feed water pipes 10. The riser tube 8 and chamber 3 constitute the aforementioned first means, the space 7 and duct 7a the second means, the pipes 10 the third means and the conduits 9 the fourth means.

Figure 1:
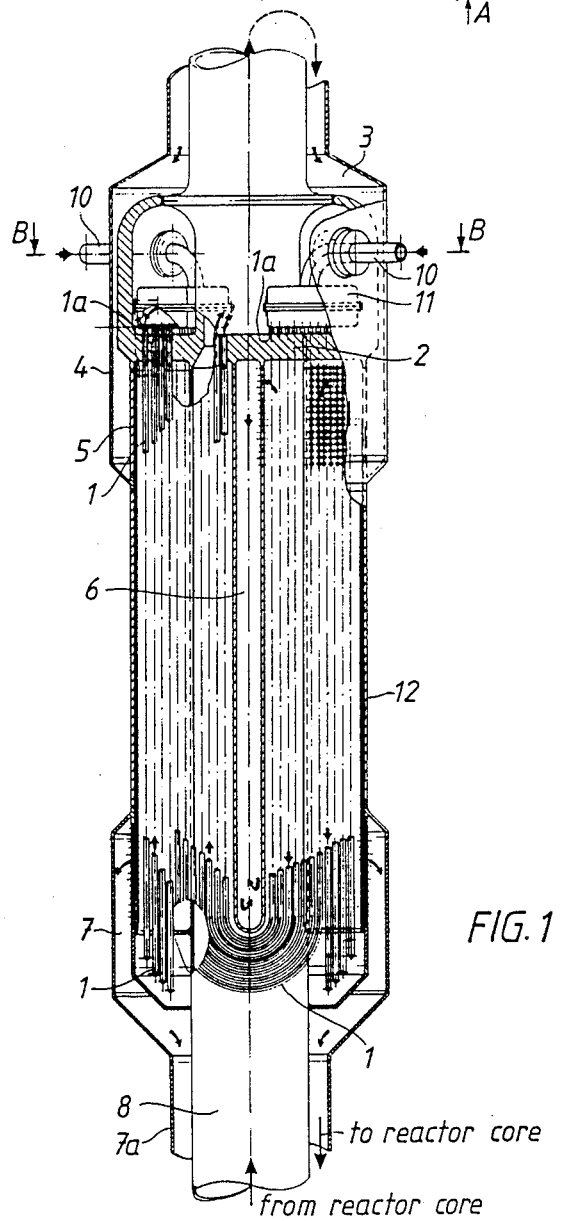
FIG. 1 is a sectional view of the steam generator taken on the line A—A in FIG. 2.
Figure 4:
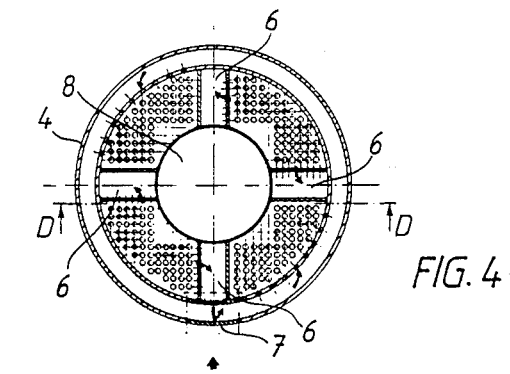
FIG. 4 is a sectional view on the line C—C in FIG. 3.
Figure 3:
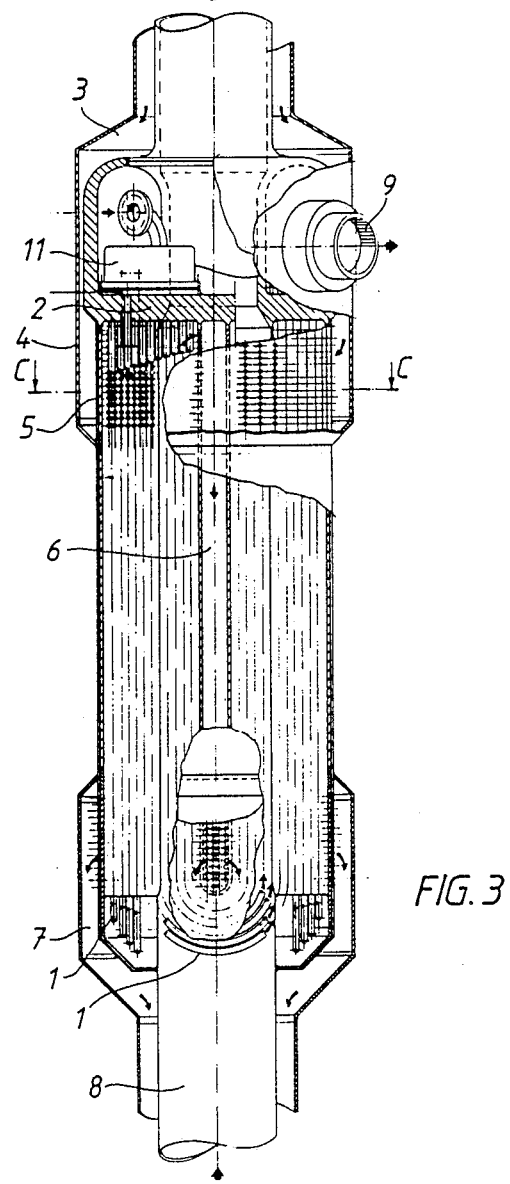
FIG. 3 is a sectional view on the line E—E in FIG. 4.

The inlets to the U-shaped tubes, where the feed water flows in, are separated from the steam space by means of a removable water box 11 which can be removed if any tube is to be plugged. The tubes 1 throughout their length may be reached for non-destructive testing, for example with an eddy current probe from the outlet end opening which is accessible from the steam space. In an alternative embodiment, which is shown in FIG. 1 of the drawings, each feed water box 11 is located somewhat above the tube plate 2 and is connected thereto by means of extensions 1a of the heat-exchange tubes 1.

A U-tube arrangement with downward flow on the secondary side presupposes that the mass flow there is relatively large in order to obtain a stable flow. However, for a reactor of the PIUS type it is desirable, in the case of partial power output, to operate with an approximately constant outlet temperature from the reactor core, whereas the primary mass flow is approximately constant when the inlet temperature on the primary side rises with decreasing power. To reduce the thermal stresses in the tube plate, the feed water can be preheated with fresh steam in a situation of partial power output.

The feed water flow, on the other hand, can be made to be approximately proportional to the power output of the reactor. For this reason, in a steam generator provided with U-tubes, the feed water can be completely evaporated even before it reaches the 360° turn at the lower end, and under these circumstances there is a risk that the flow conditions on the secondary side become unstable. This can be avoided, for example, by arranging for the number of U-tubes which are being used for feed water flow to be adjusted to the volume of feed water flow. In practical terms this can be achieved by locating the inlet ends of the heat-exchange tubes in a plurality of mutually separable spaces. Under full power operating conditions, all these spaces are used and are connected to each other and to the feed water pipes 10. When the power and the steam production of the reactor are reduced, some of the heat-exchange tubes are successively shut off from the supply of feed water, whereas the remaining tubes still receive a supply of feed water close to the normal supply volume, whereby the flow therein remains stable. In this way, a stable flow on the secondary side can be ensured over the entire power range.

The primary cooling water, which does not come into contact with heat-exchange tubes which are supplied with feed water on the secondary side, will not, under these circumstances, be cooled in the steam generator. However, after leaving the steam generator, the primary cooling water will be mixed with fully cooled water which has been contacting water-filled heat-exchange tubes, and the resultant mixture has the same temperature as if the same amount of feed water had been supplied to all the tubes. Since the cooling of the primary coolant in a steam generator typically only amounts to about 30° C., thermal stresses in the equipment, caused by the sectioning, can be prevented from reaching impermissible values.

Various modifications can be made to the design shown in the drawings and all such modifications falling within the scope of the following claims should be understood to be part of this invention.

What is claimed is:

1. A steam generator for a pressurized water-cooled nuclear reactor comprising first means for the supply of hot primary water from the reactor to the generator, second means for returning primary water to the reactor, third means for supplying secondary feed water to the generator and fourth means for removing steam created by the feed water in the generator, and a horizontal tube plate having an upper surface provided in the steam generator, the upper surface of which tube plate is contacted by the secondary water, and at least one vertically disposed U-shaped bundle of heat exchange tubes, each tube in the bundle having a first upper end communicating with the third means for supplying secondary feed water and a second upper end communicating with the fourth means, each tube being welded to the upper surface of the tube plate at its two upper ends wherein the tube plate is of annular form and the primary water flows upwardly through the center of the tube plate in a riser tube forming part of the first means, and wherein the riser tube feeds hot primary water to an annular duct forming part of the second means and through which the third and fourth means pass, water in this annular duct flowing below the tube plate to surround and contact the tubes of the at least one bundle to thereby exchange thermal energy with the feed water/steam flowing in the heat exchange tubes.

2. A generator as claimed in claim 1, in which there are four bundles of U-shaped tubes, wherein the first upper end of each tube in each bundle being in communication with the third means and the second upper end of each tube in each bundle being in communication with the fourth means.

3. A generator as claimed in claim 2, further comprising an openable water box which contains the first upper ends of the tubes, whereby the first upper ends are accessible by opening the water box.

4. A generator as claimed in claim 2, further comprising a removable water box which contains the first upper ends of the tubes, whereby the first upper ends are accessible by removing the water box.

5. A steam generator for a pressurized water-cooled reactor which includes a first means for supplying primary hot water from the reactor to the generator, second means for returning primary water to the reactor, third means for supplying secondary feed water to the generator and fourth means for removing steam created from the secondary feed water from the generator, comprising:

a vertical riser tube comprising the first means;

U-shaped heat exchange tubes arranged in bundles around the riser tube, each tube having two open upper ends such that one upper end communicates with the third means for supplying secondary water and the other upper end communicates with the fourth means, the tube bundles defining vertical gaps therebetween having upper and lower ends;

means for communicating the second means for returning primary water with the lower ends of the vertical gaps between the tube bundles;

means for supplying hot primary water from the riser tube to the outside of the one upper ends of the tubes; and means for communicating the upper ends of the vertical gaps with the other upper ends of the tubes;

whereby the supplied hot water contacts the tubes and generates steam from feed water located therein, the primary water travelling along the tubes until losing contact with the tubes near the other upper ends and flowing through the vertical gaps and ultimately to the reactor.

6. The steam generator according to claim 5 wherein the communicating means between the vertical gap upper ends and other tube upper ends comprises a perforated plate.

7. A steam generator according to claim 5, wherein in each bundle of tubes, each end of each U-shaped tube is attached to a common tube plate.

8. A steam generator according to claim 7, wherein means is provided above the tube plate for separating the supplied feed water from the removed steam.

9. A steam generator according to claim 5, wherein the hot water is adapted to be supplied to the tube bundles radially from an annular space, the outer wall of this space constituting the outer boundary of the steam generator.

10. A steam generator according to claim 9, wherein the hot water is adapted to be returned, after giving off heat, radially to a second annular space at the lower end of the tube bundles, which second annular space is connected to the second means.

11. A steam generator according to claim 5, wherein each vertical gap for returning the hot water is adapted to separate a region where the hot water flows upwards from a region where the hot water flows downwards around the tube bundles.

* * * * *